No. 715,019. Patented Dec. 2, 1902.
F. E. CASE.
MEANS FOR SYNCHRONIZING MOTORS.
(Application filed Feb. 11, 1899.)
(No Model.)
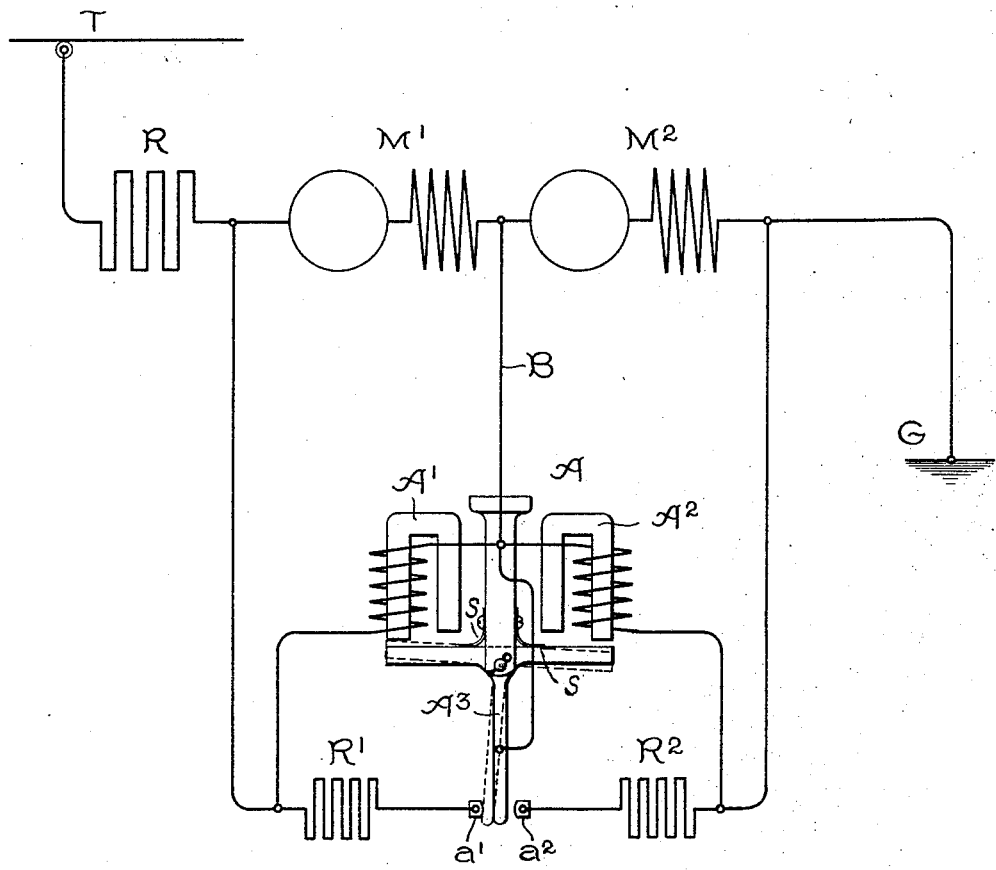
WITNESSES.
A. Ernst Altenpohl.
A. F. Macdonald.
INVENTOR.
Frank E. Case.
by Albert G. Davis.
Att'y.

UNITED STATES PATENT OFFICE.

FRANK E. CASE, OF SCHENECTADY, NEW YORK, ASSIGNOR TO THE GENERAL ELECTRIC COMPANY, A CORPORATION OF NEW YORK.

MEANS FOR SYNCHRONIZING MOTORS.

SPECIFICATION forming part of Letters Patent No. 715,019, dated December 2, 1902.

Application filed February 11, 1899. Serial No. 705,301. (No model.)

*To all whom it may concern:*

Be it known that I, FRANK E. CASE, a citizen of the United States, residing at Schenectady, county of Schenectady, State of New York, have invented certain new and useful Improvements in Means for Synchronizing Motors, (Case No. 777,) of which the following is a specification.

My present invention has for its object to provide a means for equalizing the action of electric motors when connected in series. It is well known that when two electric motors are connected in series they should for best results be geared to the same load, as if one runs faster than its normal rate it tends to stop the other. For example, when two motors connected in series are geared to different axles of a railroad-car if one of them slips and then speeds up its counter electromotive force rises to such a degree that the torque of the other motor is materially reduced, and as the slipping motor exerts practically no useful effect the car tends to stop entirely. It is then necessary to cut in resistance until the speed of the slipping motor is reduced to that corresponding to the speed of the car, when it will "catch," an operation causing some considerable delay and annoyance. This action is particularly troublesome in wet weather, when it sometimes renders the maintenance of schedule time impossible. I obviate the trouble by connecting in a shunt around each motor a device which when the motor slips and its counter electromotive force runs up closes a circuit around the slipping motor, so that current may flow to the other motor in a measure independently of the current-flow in the circuit of the slipping or racing motor.

The improvement, therefore, in the art of regulating electric motors which I have devised consists in one aspect of thus establishing a current-path around the slipping motor whenever its counter electromotive force runs up, which tends to weaken the torque of the slipping motor, as well as to strengthen the torque of the other motor. The specific mechanism which I have devised for this purpose consists of a pair of electromagnets connected in series around the two motors with a lead from the wire between the magnets to a point between the motors. These magnets are balanced in their action so long as the drop around the two motors or current-flow in them is equal. An armature under the influence of the magnets controls a switch, which when thrown to one side or to the other establishes a new current-path around one or the other of the two motors. The current-path preferably includes a moderate resistance, for reasons presently to be explained. I take this description of the device as typical of any which may be devised embodying my invention.

The accompanying drawing is a diagram showing the invention in one form which it may take, in which the particular mechanism just briefly described is employed; but of course many other means might be used to carry out the method.

In the drawing, T is the trolley, R is the resistance, $M'$ $M^2$ are the motors, and G is the ground-wire.

I do not show any special means of regulating the motors in the ordinary sense of the term, because any controlling device whatever may be employed—as, for example, a series parallel controller.

A is the device embodying my invention, consisting of the balanced magnets $A'$ $A^2$ in a circuit around the motors with a lead B from a point between them to a point between the motors. The switch-blade $A^3$ is controlled by the action of the magnets and reciprocates between contacts $a'$ $a^2$ in circuit, respectively, with the resistance $R'$ $R^2$. The winding of the magnets is of high resistance, as it must exhaust the entire potential across the circuit without taking an unreasonably large current.

The action of the device is as follows: Assume, for instance, that motor $M'$ races and its counter electromotive force rises, so that the current in the circuit of the two motors is cut down and the torque of the motor $M^2$ falls off. Under these conditions the drop around the motor $M'$ will be so great that the magnet $A'$ will overpower the magnet $A^2$ and draw up the armature, throwing the switch $A^3$ to the dotted-line position, thus establishing a circuit by way of the resistance $R'$, contact $a'$, and lead B to the terminal of the motor M². The resistance R' acts to steady the motor against the sudden rise of potential and prevents a jerky action. Owing to the resistance and counter electromotive force of the motor M' the greater part of the current will be diverted around it to the motor M², the torque of the motor M' will be greatly cut down, and the torque of the motor M² increased. Under these conditions the motor M' will slow down until the wheel which it drives again adheres to the track. When the motors are again "in step," so to speak, the magnets A' A² will be balanced and the switch will open. Theoretically, as soon as the switch-blade touches the contact $a'$ the magnet A' is short-circuited; but owing to the high-resistance winding it takes a short time for its magnetomotive force to run down, the action being thus prolonged for a moment. In practice the switch-blade A³ will vibrate from one contact to the other in accordance with the relative speed of the motors M' M². No difficulty occurs on account of sparking at these contacts, inasmuch as only half the line-voltage is broken at them at any time; but as an additional precaution I may make the contacts $a'$ $a^2$ of carbon and, if preferred, any usual or suitable arc-extinguishing means, such as a blow-out magnet, may also be employed. The springs S S are used to prevent the action from being produced by mere accidental differences in the counter electromotive forces of the two motors, such as might be produced by differences in their characteristic curves.

My invention is in no manner limited to two motors, though it will be most generally thus applied. Its application to other numbers of machines is apparent and requires no illustration or description.

I do not claim in this application the method disclosed herein, since it constitutes the subject-matter of a divisional application, Serial No. 103,092, filed April 16, 1902.

Having thus described my invention, what I claim as new, and desire to secure by Letters Patent of the United States, is—

1. The combination of motors in series with means actuated by an increase in electromotive force of any motor above that of others, for diverting current from such motor to the other or others.

2. The combination of motors in series, with means for shunting as a whole any motor which tends to slip, and means operating on the slipping of said motor for actuating said shunting means.

3. The combination of motors in series, with means for closing a shunt-path around any motor which tends to slip and thus increasing the current in the non-slipping motor or motors, and means operating upon the slipping of said motor for actuating said shunting means.

4. The combination of motors in series, with an electromagnetic switch acting automatically to shunt any motor which tends to slip.

5. The combination of two motors in series, with an electromagnetically-operated switch having windings in shunt to each motor, the two windings being opposed in effect so that when the current-flow in the two motors is equal, the switch is in a neutral position, with contacts upon the switch for closing a shunt-path around either motor; whereby when the drop around one motor exceeds that around the other, the switch will be actuated to close a shunt-path around the motor the circuit of which has the greater drop.

6. The combination of a pair of motors driving a common load but not mechanically geared together, with means for increasing the torque of one of the motors when the other tends to slip.

7. The combination of a pair of motors driving a common load but so geared that one or the other of the motors may slip or race, with an electromagnetically-operated switch automatically acting to divert current from the slipping motor to the circuit of the motor at normal speed.

8. The combination of motors in series, with an electromagnetic switch acting automatically to shunt any motor which tends to slip and means for preventing the action from taking place by mere accidental difference of counter electromotive force.

In witness whereof I have hereunto set my hand this 10th day of February, 1899.

FRANK E. CASE.

Witnesses:
B. B. HULL,
EDWARD WILLIAM, Jr.